US012267686B2

(12) United States Patent
Alasti et al.

(10) Patent No.: US 12,267,686 B2
(45) Date of Patent: Apr. 1, 2025

(54) HIERARCHICAL NETWORK SLICING FOR COMMUNICATION SERVICES

(71) Applicant: DISH Wireless L.L.C., Englewood, CO (US)

(72) Inventors: Mehdi Alasti, Arlington, VA (US); Kazi Bashir, Lewisville, TX (US); Siddhartha Chenumolu, Broadlands, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 356 days.

(21) Appl. No.: 17/744,573

(22) Filed: May 13, 2022

(65) Prior Publication Data

US 2023/0308882 A1 Sep. 28, 2023

Related U.S. Application Data

(60) Provisional application No. 63/323,030, filed on Mar. 23, 2022.

(51) Int. Cl.
*H04W 48/00* (2009.01)
*H04W 16/10* (2009.01)

(52) U.S. Cl.
CPC .................................. *H04W 16/10* (2013.01)

(58) Field of Classification Search
CPC .............................. H04W 16/10; H04W 48/00
See application file for complete search history.

(56) References Cited

U.S. PATENT DOCUMENTS

| 12,057,990 | B2* | 8/2024 | Zhang | H04L 41/342 |
| 2018/0376407 | A1 | 12/2018 | Myhre et al. | |
| 2019/0200209 | A1* | 6/2019 | Velev | H04W 8/08 |
| 2020/0107250 | A1* | 4/2020 | So | H04W 48/18 |
| 2021/0127302 | A1* | 4/2021 | Young | H04W 76/36 |

(Continued)

FOREIGN PATENT DOCUMENTS

WO WO 2021183870 A1 9/2021

OTHER PUBLICATIONS

Etsi, "5G; System architecture for the 5G System (5GS)," Technical Specification 123 501, Version 15.7.0, Oct. 2019, 250 pages.

(Continued)

*Primary Examiner* — Shukri Taha
(74) *Attorney, Agent, or Firm* — Seed IP Law Group LLP (57) ABSTRACT

Embodiments are directed towards systems and methods for hierarchical network slicing for communication services. An example method includes obtaining a set of single network slice selection assistance information (S-NSSAI); for each S-NSSAI of the set, determining a Tenant Slice-Group based, at least in part, on a slice differentiator (SD) part of the S-NSSAI; and processing the set of S-NSSAI in accordance with a hierarchy of network slicing including a plurality of Tenant Slice-Groups each including one or more network slices. The slices can inherit functionality from their respective root of a corresponding Tenant Slice-Group, geographic granularity or availability of each slice can be based on its Tenant Slice-Group, and Unified Access Control (UAC) can be implemented based, at least in part, on Tenant Slice-Group identification.

16 Claims, 7 Drawing Sheets

Hierarchical Multi-Tenant Slicing Architecture (56) References Cited

U.S. PATENT DOCUMENTS

2023/0148302 A1* 5/2023 Ping .................. H04W 24/02
370/254

OTHER PUBLICATIONS

3rd Generation Partnership Project, C4-185509, "SST Value Not Associated with any Valid SD," CT (Core Network & Terminals) WG4 Meeting #85 bis, Sophia Antipolis, France, Jul. 9-13, 2018. (3 pages).

3rd Generation Partnership Project, S2-1810631, "Discussion Whether UAC is Capable of Handling Slice Related Congestion," SA (Service and System Aspects) WG2 Meeting #128 bis, Sophia Antipolis, France, Aug. 20-24, 2018, pp. 1-10.

International Search Report and Written Opinion, mailed Jun. 7, 2023, for International Patent Application No. PCT/US2023/015958. (16 pages).

* cited by examiner

Fig. 1 Network Slice Identification - S-NSSAI

- 3GPP specifies: S-NSSAI (SST & SD)

S-NSSAI Format and Applicability:

| SST (Slice/Service Type) | SD (Slice Differentiator) |
|---|---|

| Slice/Service type | SST value | Service |
|---|---|---|
| eMBB | 1 | 5G enhanced Mobile Broadband |
| URLLC | 2 | ultra-reliable low latency communications. |
| MIoT | 3 | massive IoT |
| V2X | 4 | V2X services |
| HMTC | 5 | High-Performance Machine-Type Communications |
| Standard | 6-127 | TBD |
| Operator Specific | 128-255 | Defined by operators |

| SST | SD | Applicability |
|---|---|---|
| Standard | Null | All PLMNs |
| Operator-specific | Null | PLMN Specific |
| Any | Non-Null | PLMN Specific |

Fig. 3 Hierarchical Multi-Tenant Slicing Architecture

Fig. 4 Hierarchical Relationship of Slicing within Tenant

Fig. 5 NSSAI-based Implementation

Fig. 6 Hierarchical Slicing Processing

Fig. 7 Computing Device

HIERARCHICAL NETWORK SLICING FOR COMMUNICATION SERVICES

CROSS-REFERENCE TO RELATED APPLICATIONS

This application claims the benefit and priority to U.S. Provisional Patent Application Ser. No. 63/323,030, filed on Mar. 23, 2022 and entitled "HIERARCHICAL NETWORK SLICING FOR COMMUNICATION SERVICES," the entirety of which is hereby incorporated by reference.

BRIEF SUMMARY

This disclosure generally relates to the architecture of network slicing for communication services, and more particularly, in the context of 5G network slicing for a multi-tenant environment. Embodiments disclosed herein are directed, at least in part, to the creation of a hierarchical network slicing architecture for a multi-tenant environment associated with a mobile network operator (MNO). The slices associated with a tenant can be grouped based on Tenant-ID(s) (e.g., Tenant-Slice-Group(s)), and the slices of a tenant can inherit some of the features based on the Tenant-ID (e.g., Tenant-Slice-Group).

The technologies disclosed herein includes a computer implemented method for hierarchical network slicing. Illustratively, the method includes obtaining a set of single network slice selection assistance information (S-NSSAI); for each S-NSSAI of the set, determining a Tenant Slice-Group based, at least in part, on a slice differentiator (SD) part of the S-NSSAI; and processing the set of S-NSSAI in accordance with a hierarchy of network slicing including a plurality of Tenant Slice-Groups each including one or more network slices. In some embodiments, the SD part of the S-NSSAI is readable to a human reader and indicates a plain meaning in a human language.

In some embodiments, the set of S-NSSAI includes a plurality of subsets and each of the subsets includes a distinct SD part different from other subsets. In some embodiments, the distinct SD part of each subset corresponds to a distinct Tenant Slice-Group in the hierarchy. In some embodiments, each S-NSSAI from a target subset includes a distinct slice/service type (SST) part different from other S-NSSAI from the target subset. In some embodiments, the distinct SST part of each S-NSSAI from the target subset corresponds to a distinct network slice of the distinct Tenant Slice-Group for the target subset in the hierarchy.

In some embodiments, at least one function of each network slice under a Tenant Slice-Group in the hierarchy is inherited from a root corresponding to the Tenant Slice-Group. In some embodiments, a corresponding granularity of geographical area for each of the plurality of Tenant Slice-Groups is based, at least in part, on a set of cells defined by an MNO for the Tenant Slice-Group.

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility. Further, the particular shapes of the elements as drawn are not intended to convey any information regarding the actual shape of the particular elements and have been selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Well-known structures and methods associated with media content delivery have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment," "an embodiment," or "some embodiments" means that a particular feature, structure or characteristic described in connection with the embodiment is included in at least one embodiment. Thus, the appearances of the phrases "in one embodiment," "in an embodiment," or "in some embodiments" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

Network Slicing

In accordance with the fifth-generation technology standard for broadband cellular networks (5G), a network slice corresponds to a logical end-to-end network and can be dynamically created, modified, or removed. Different slices can be created for or associated with different service types, including various slice types for committed services, slice types for dedicated customers, or the like. A network slice can include component(s) of 5G core network (e.g., control plane (CP) and user plane (UP) functions), 5G radio access network (RAN), interworking functions to non-3GPP access networks such as Wi-Fi networks, and/or other network components or functions controlled by an MNO. A user equipment (UE) can connect to a maximum of 8 slices in parallel, and a common access and mobility management function (AMF) can be associated with the UE for all the slices.

Slice Identification

Figure 1:
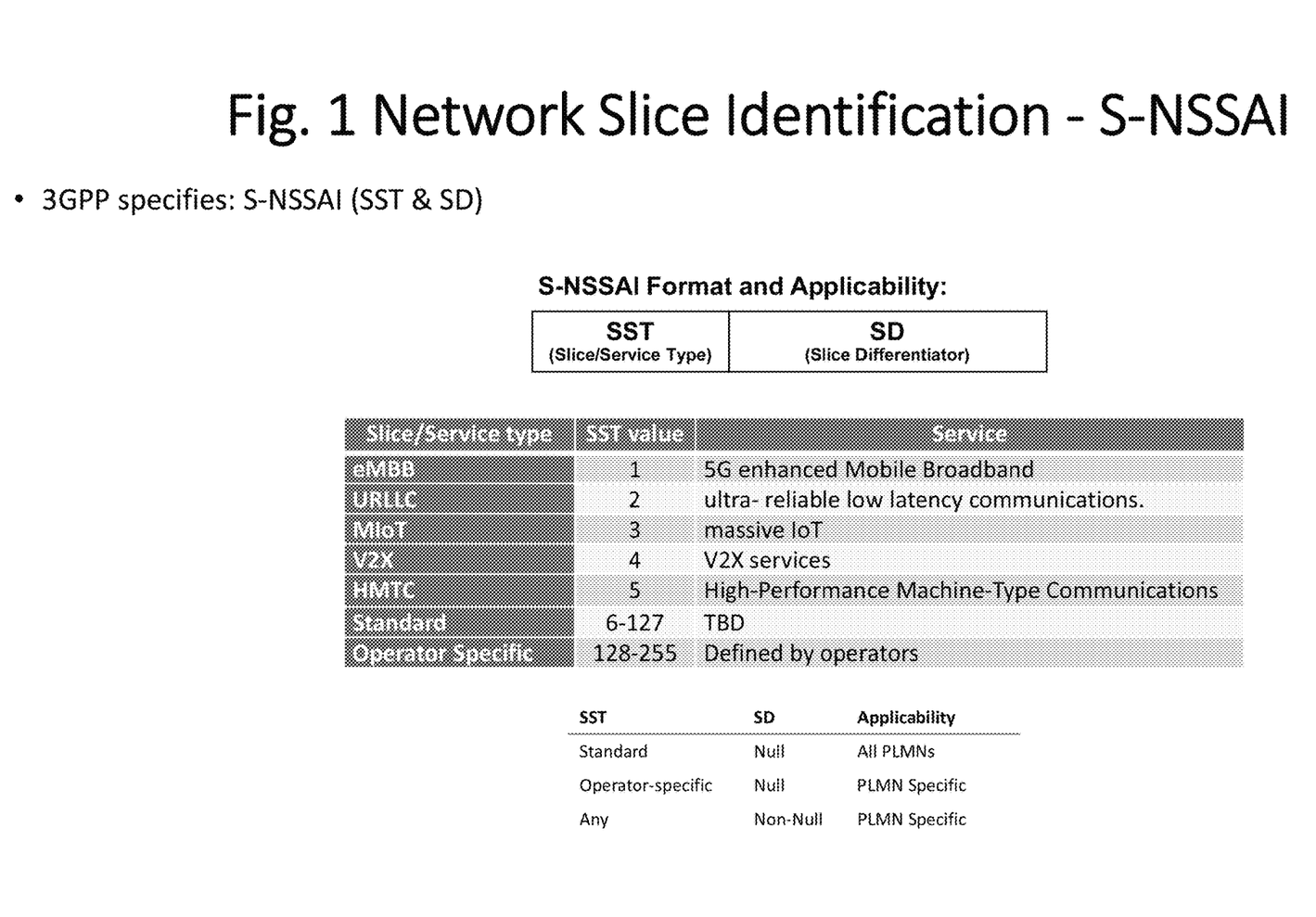
FIG. 1 shows detailed information regarding single network slice selection assistance information (S-NSSAI), slice/service type (SST), and slice differentiator (SD).

In accordance with 5G, a network slice can be identified using single network slice selection assistance information (S-NSSAI). The S-NSSAI contains two components: the slice/service type (SST) and an optional slice differentiator (SD). SST typically describes expected network behavior, and the optional SD can be used for further differentiation. S-NSSAI can have standard or network-specific values. Standard SST values can include eMBB, URLCC, MIoT, etc. FIG. 1 shows detailed information regarding S-NSSAI, SST, and SD. Network slice selection assistance information (NSSAI) is a collection of S-NSSAI(s) (8 maximum), and a UE sends NSSAI (e.g., to a base station or other component of RAN), which serves as a basis for selection of related slice(s).

Hierarchical Multi-Tenant Slicing Architecture

Figure 2:
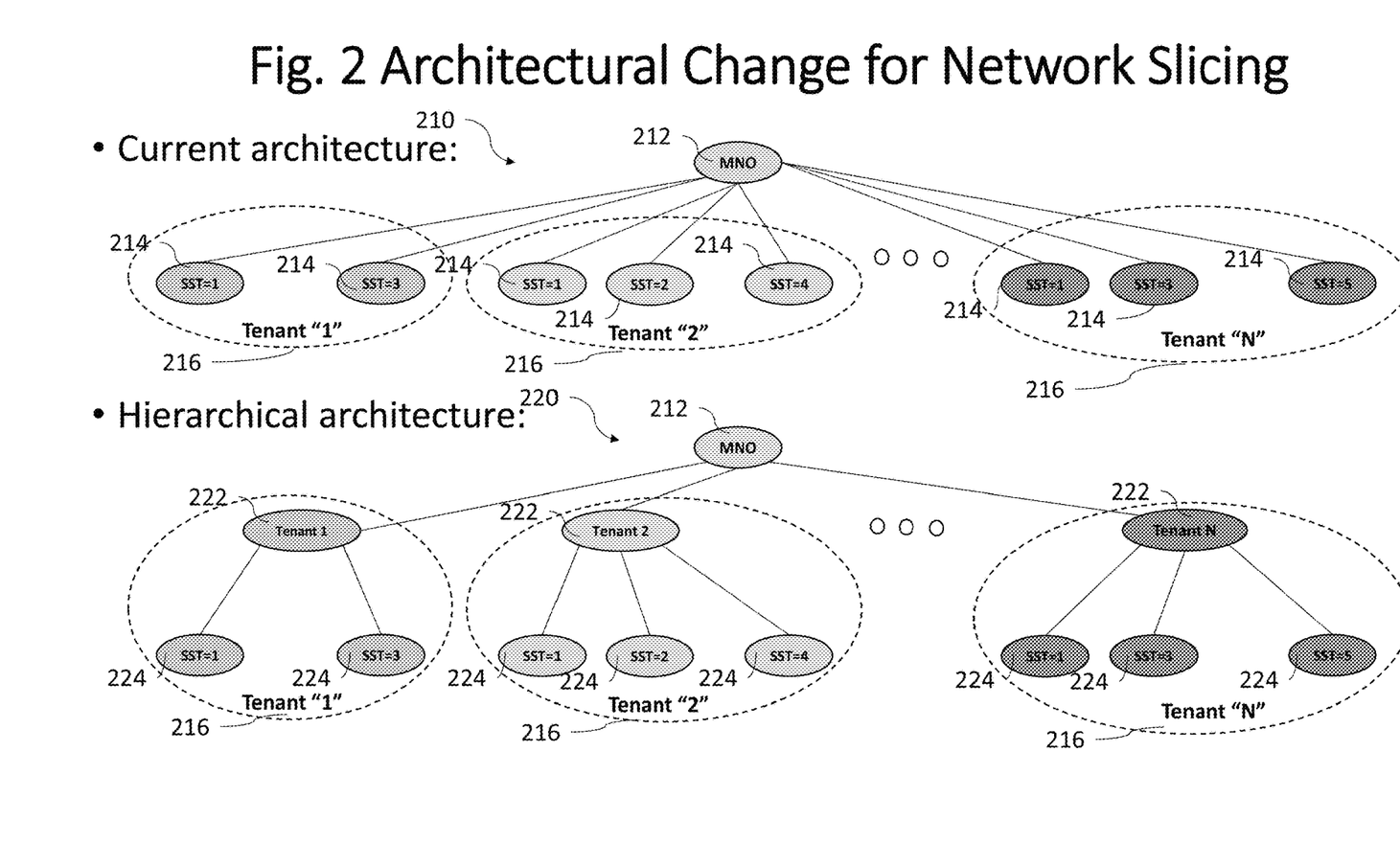
FIG. 2 shows an example illustrating an architectural change for network slicing, in accordance with various embodiments of the presently disclosed technologies.

FIG. 2 shows an example illustrating an architectural change for network slicing, in accordance with various embodiments of the presently disclosed technologies. As shown, in the current architecture 210, an MNO 212 is directly associated with various slices 214 (e.g., indicated by specific SST values) of individual tenants 216, forming a "flat" relationship. In a hierarchical architecture 220, the MNO 212 is associated with various tenant representations 222, each of which in turn is further associated with their slices 224. Illustratively, a tenant can be an enterprise or private network, a mobile virtual network operator (MVNO), or other mobile network entity that is facilitated by the MNO.

In some embodiments, the MNO offers 5G services to various tenants in a multi-tenant environment. The MNO can offer services to these tenants using network slicing as a service (NSaaS) model. Each one of these tenants may plan to support their own services using their own slices. In other words, each tenant may have multiple slices to serve their customers. In some embodiments, the technologies disclosed herein use the "SD" part of S-NSSAI to map to a group of one or more slices of a tenant, which can be referred to as a "Tenant Slice-Group." The SD itself can be readable, meaningful, or otherwise associable with the tenant in a human-interpretable form. For example, the SD can be the tenant's name or acronym. One or more SDs can be assigned to a single tenant, and the SDs can be different versions of variants of the tenant's name or acronym. Within the tenant, the technologies disclosed herein can use the "SST" value to specify the tenant's own slices. SD.STT combinations can indicate tenant service meanings, e.g., "Enterprise1.eMBB", "Enterprise1.MIoT", or the like.

Figure 3:
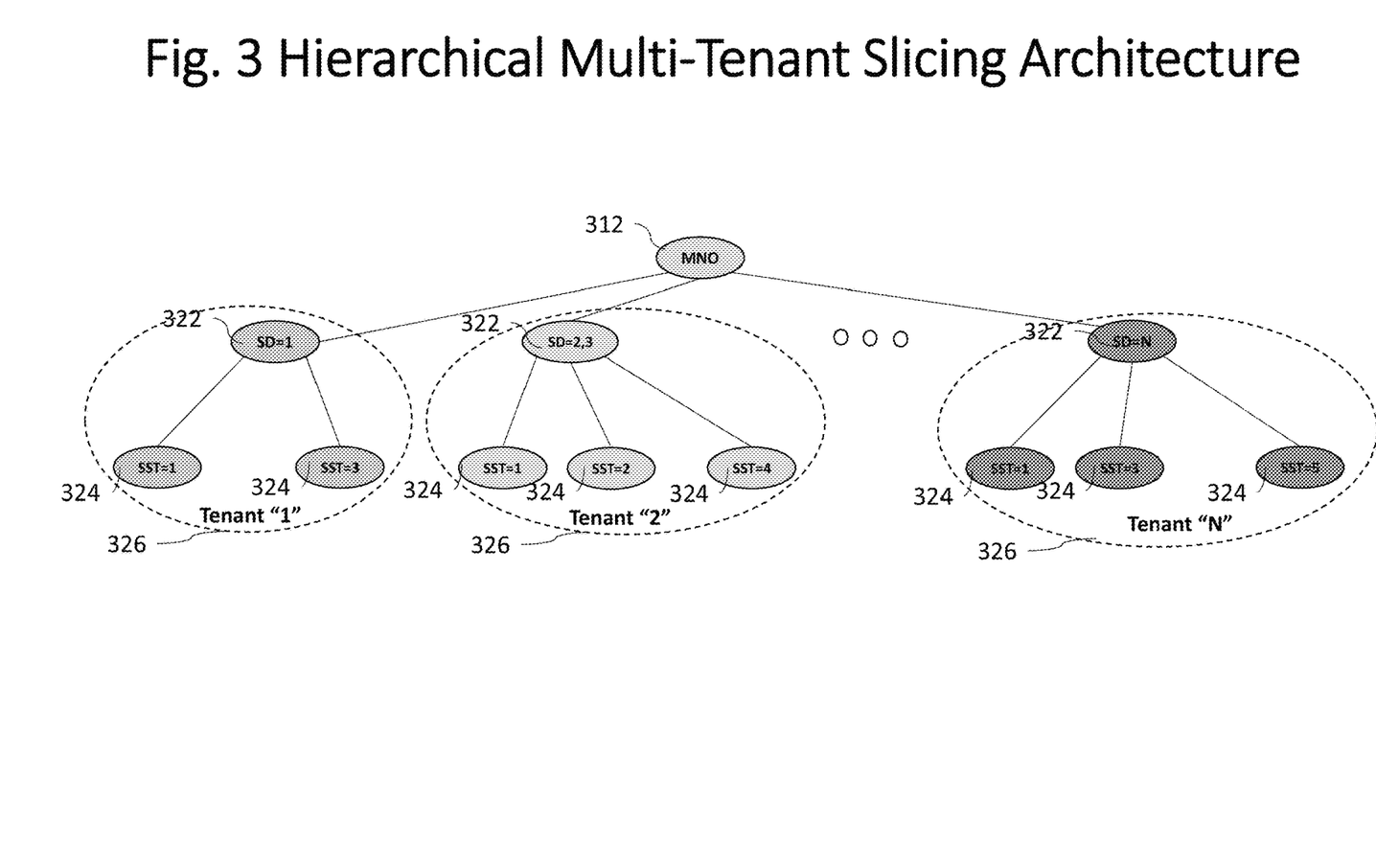
FIG. 3 shows an example of a hierarchical architecture for network slicing, in accordance with various embodiments of the presently disclosed technologies.

FIG. 3 shows an example of such a hierarchical architecture for network slicing, in accordance with various embodiments of the presently disclosed technologies. As illustrated, an MNO 312 is associated with various tenants 326. One or more SDs 322 are assigned to each tenant 326 as its representation and can be further associated with one or more slices 324.

Figure 4:
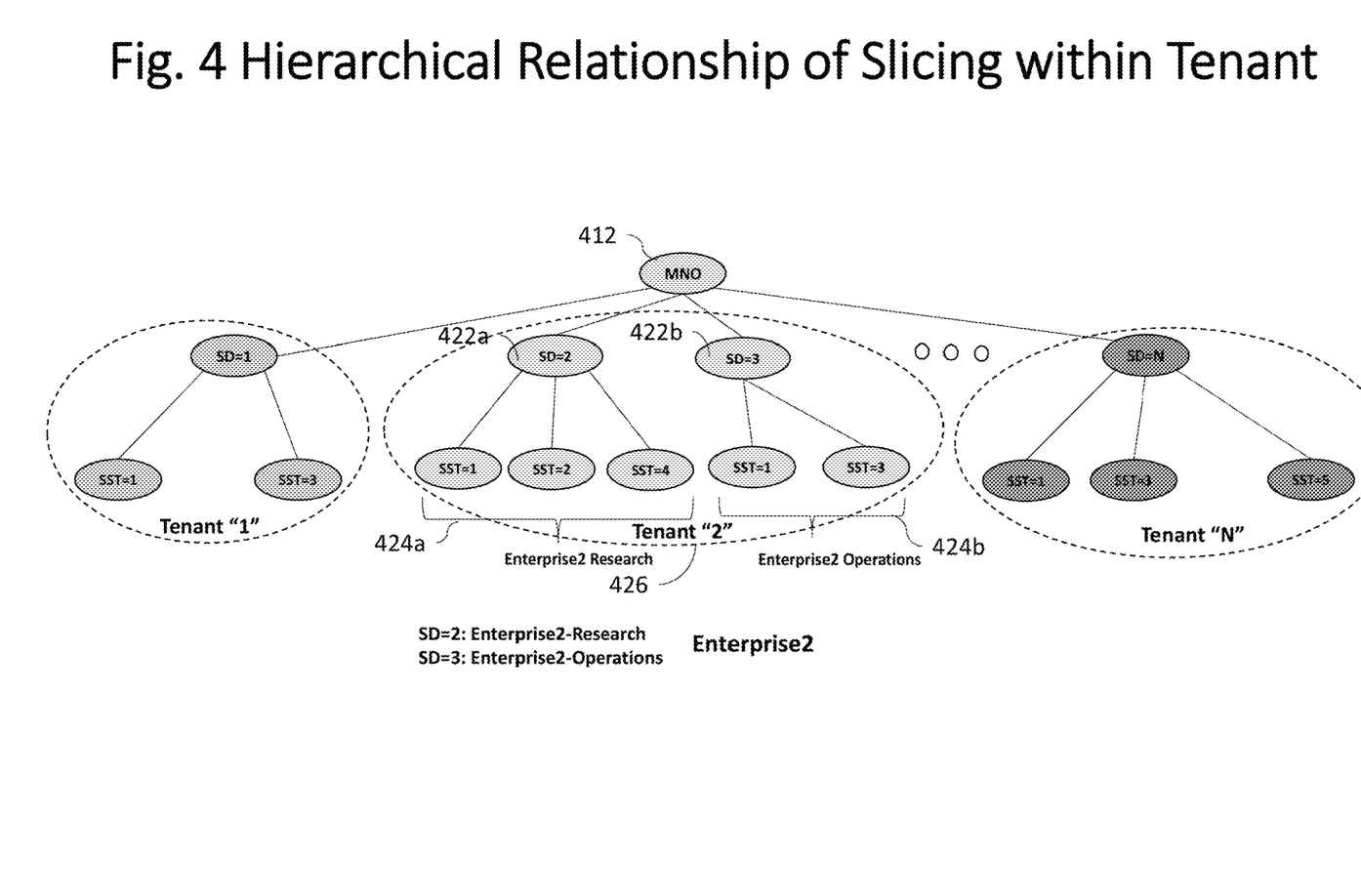
FIG. 4 shows an example of hierarchical relationship of slicing within a single tenant based on multiple SDs assigned to the tenant.

FIG. 4 shows an example of hierarchical relationship of slicing within a single tenant based on multiple SDs assigned to the tenant. As illustrated, an MNO 412 is associated with various tenants including tenant 426. Here, two SDs 422a and 422b are assigned to the tenant 426 as its representation, each further associated with a respective group of slices 424a and 424b.

NSSAI Based Implementation

Figure 5:
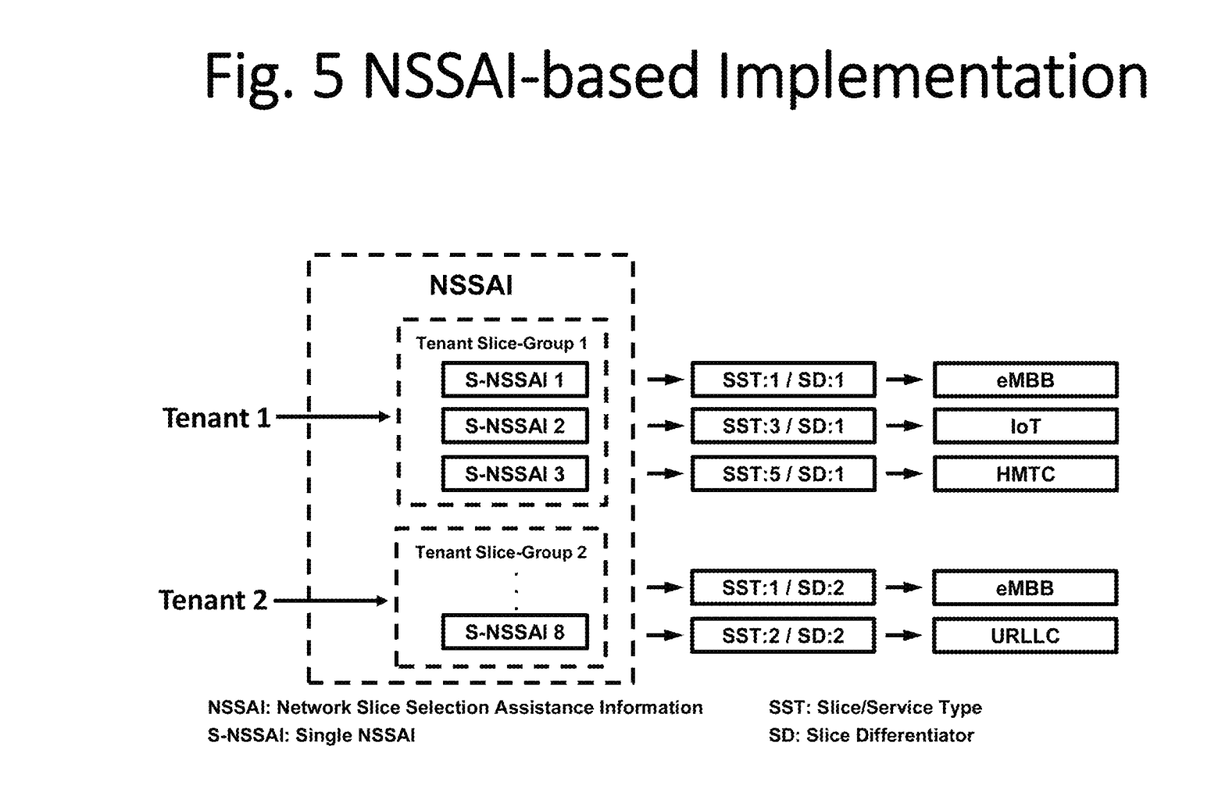
FIG. 5 shows an example of network slice selection assistance information (NSSAI) based implementation of multiple Tenant Slice-Groups for user equipment (UE), in accordance with various embodiments of the presently disclosed technologies.

As stated above, a UE can connect to up to 8 slices (corresponding to 8 S-NSSAIs) that it maps to an NSSAI, and the slices (as identified by S-NSSAIs) of a tenant are mapped to a Tenant Slice-Group through SD. So, a UE's NSSAI can contain one "Tenant Slice-Group" or multiple "Tenant Slice-Groups". A network slice (corresponding to an S-NSSAI) can typically be available per public land mobile network (PLMN) or tracking areas (TAs). In accordance with various embodiments of the technologies disclosed herein, a "Tenant Slice-Group" can be made available per PLMN or TAs. Alternatively or in addition, the "Tenant Slice-Group" can be made available per a set of cells. For example, one tenant can be limited to a single cell while another tenant can be made available in a group of multiple cells. In some embodiments, a Rel-17 Multi-SIM (MUSIM) device can support SIMs each mapped to one tenant (Tenant Slice-Group). FIG. 5 shows an example of NSSAI-based implementation of multiple Tenant Slice-Groups for UE, in accordance with various embodiments of the presently disclosed technologies.

Tenant Slice-Group Features

Some of the 3GPP features can be more efficient or effective when mapped to a "Tenant Slice-Group", and the slices of that "tenant" can inherit several features through the "Tenant Slice-Group."

For example:

1. Release-17 RAN specified "slice-based cell selection" and "slice-based random access (RACH)" to enhance service continuity for slices.
    These RAN features can be more efficient or effective when implemented based on "Tenant Slice-Group" (per tenant).
    To assist cell reselection, include "Tenant Slice-Group" info (in SI message) in RRCRelease message.
    RACH occasions per "Tenant Slice-Group."
2. Release-16 supports slice based authentication by a 3rd party. The 3rd party can be a tenant that is identified by the "Tenant Slice-Group" or "SD".
    All the UEs attaching to the tenant NSaaS can be authenticated by the tenant (through NSSAAF and AAA-S)
3. Also, some of the Release-16 slicing features can be more efficient or effective when implemented based on "Tenant Slice-Group".
    Network Slice Management Charging in 5G System (SP-190788)
    Network Slice Performance and Analytics Charging in 5G System (SP-190780)

3GPP, GSMA and/or the equipment vendors can define and implement some of the features for "Tenant Slice-Group" to achieve better performance or quality of service:

1. NW Instance and the NFs associated with "Tenant Slice-Group" (SD) instead of "Slice" (S-NSSAI)
2. Supported PLMN and/or TAs be based on "Tenant Slice-Group" (SD) instead of "Slice" (S-NSSAI)
3. Admission control, especially the Rel-17 features such as:
    the maximum number of UEs allowed to be served by a network slice the maximum number of PDU Sessions allowed to be served by a network slice
4. GST (Generic Slice Template)/NEST (NEtwork Slice Type) (in GSMA)
5. Performance, KPIs and analytics based on the "Tenant Slice-Group" and the agreement with the tenant
6. Charging based on "Tenant Slice-Group" and "Slice"
7. Support of mobility and session continuity can be based on "Tenant Slice-Group"
8. RACH can be based on "Tenant Slice-Group" or a group of "Tenant Slice-Groups"

Use Case Example

A "Public Safety Slice-Group" can include several slices for different services including, e.g., MC-PTT, voice calls, Group Communication, eMBB, and IoT. For an emergency, an operator creates a "Public Safety Slice-Group" with a set of slices to support public safety services in a TA, where the corresponding SD=Public Safety Slice-Group.

The Public Safety department can authenticate Public Safety officers and can authorize the slices/services within the "Public Safety Slice-Group" depending on officers' profiles. The mobile devices of the Public Safety officers can also be connected to other "Tenant Slice-Groups" for other non-Public Service purposes.

The "Public Safety Slice-Group" can support mobility in a restricted geographical area. The charging of the Public Safety services can be based on both "Public Safety Slice-Group" (SD) and the "slices" (SSTs). The performance, KPIs and the assurance of the "Public Safety Slice-Group" is independent of the other "Tenant Slice-Groups".

After the emergency is taken care of, the "Public Safety Slice-Group" can be closed, e.g., by invalidating the SD of Public Safety Slice-Group.

Tenant-Based Unified Access Control (UAC)

3GPP 5G New Radio (NR) has specified Unified Access Control (UAC) as a set of mechanisms to determine whether to allow a UE for specific services or state changes. In 4G LTE, access control (e.g., access class barring) is controlled by RRC, but 5G NR allows non-access stratum (NAS) to have more control over the Access Control. One of the parameters that can be defined for UAC is slice-ID: S-NSSAI. It can be more flexible and efficient for 3GPP 5G NR to support SD (tenant-ID) level for UAC. In other words, the subscribers of a specific tenant are allowed to access for specific services based on the slice-ID (SD).

Figure 6:
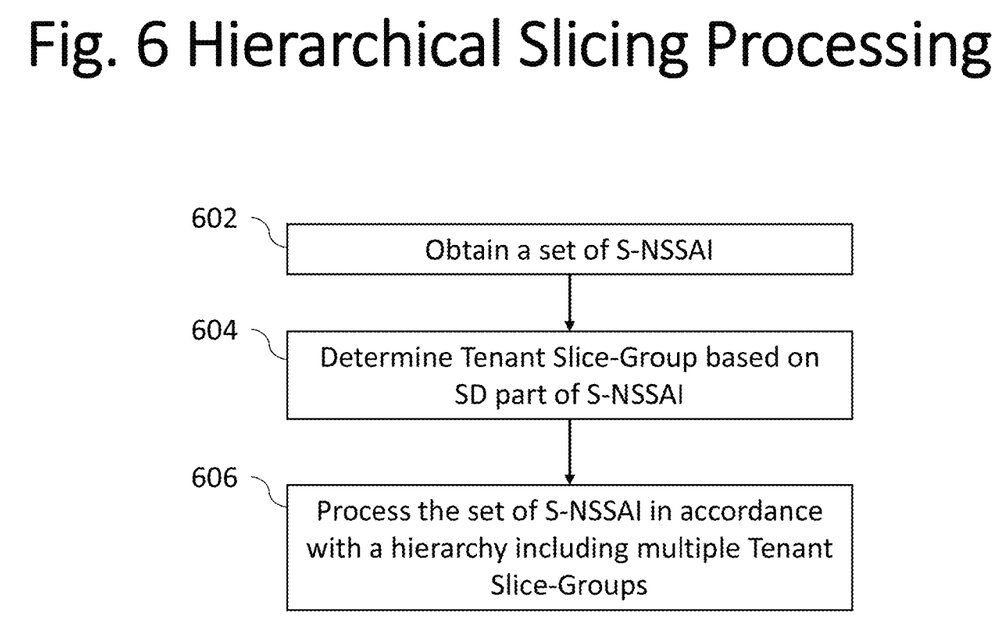
FIG. 6 is a flow chart illustrating an example method for hierarchical slicing processing in accordance with various embodiments of the presently disclosed technologies.

FIG. 6 is a flow chart illustrating an example method for hierarchical slicing processing in accordance with various embodiments of the presently disclosed technologies. The method can be performed, alone or in combination, by a UE, a base station or other RAN component, or a 5G Core component.

The method starts at block 602, where the method includes obtaining a set of S-NSSAI. In some embodiments, the set of S-NSSAI includes one or more subsets and each of the subsets includes a distinct SD part different from other subsets. In some embodiments, the distinct SD part of each subset corresponds to a distinct Tenant Slice-Group in the hierarchy. In some embodiments, the SD part of the S-NSSAI is readable to a human reader and indicates a plain meaning in a human language.

As an example shown in FIG. 5, the set of S-NSSAI can be an NSSAI. A UE can connect to up to 8 slices (corresponding to 8 S-NSSAIs) via an NSSAI, and the slices (as identified by S-NSSAIs) of a tenant are mapped to a Tenant Slice-Group through SD. So, a UE's NSSAI can contain one "Tenant Slice-Group" or multiple "Tenant Slice-Groups".

At block 604, the method includes determining a Tenant Slice-Group based, at least in part, on an SD part of individual S-NSSAI. The SD part can be mapped to a Tenant Slice-Group in a hierarchy of network slicing, which can be predefined, regularly updated, or dynamically generated. Examples of the hierarchy are shown in FIGS. 3 and 4.

At block 606, the method includes processing the set of S-NSSAI in accordance with the hierarchy of network slicing including one or more Tenant Slice-Groups each including one or more network slices. In some embodiments, each S-NSSAI from a particular subset includes a distinct SST part different from other S-NSSAI from the subset. In some embodiments, the distinct SST part of each S-NSSAI from the subset corresponds to a distinct network slice of the distinct Tenant Slice-Group for the subset in the hierarchy. FIG. 4 provides an example of further hierarchical relationship of slicing within a tenant.

In some embodiments, at least one function of each network slice under a Tenant Slice-Group in the hierarchy is inherited from a root corresponding to the Tenant Slice-Group. In some embodiments, a corresponding granularity of geographical area for each of the plurality of Tenant Slice-Groups is based, at least in part, on a set of cells defined by an MNO for the Tenant Slice-Group.

Those skilled in the art will appreciate that the various operations depicted via FIGS. 2-6, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 7:
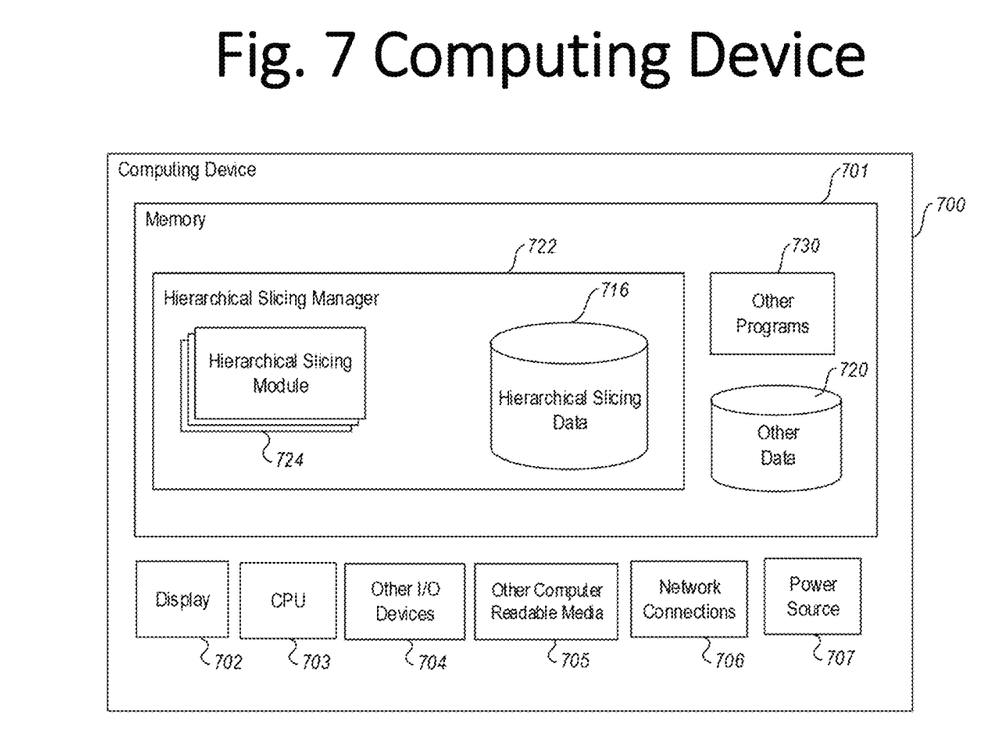
FIG. 7 is a block diagram illustrating elements of an example computing device utilized in accordance with some embodiments of the techniques described herein.

FIG. 7 is a block diagram illustrating elements of an example computing device 700 utilized in accordance with some embodiments of the techniques described herein. Illustratively, the computing device 700 corresponds to a base station (e.g., gNB) or other RAN component, a UE (e.g., a mobile phone, tablet computer, Internet-of-Things (IoT) device, or the like), a component of 5G Core network, or at least a part thereof.

In some embodiments, one or more general purpose or special purpose computing systems or devices may be used to implement the computing device 700. In addition, in some embodiments, the computing device 700 may include one or more distinct computing systems or devices, and may span distributed locations. Furthermore, each block shown in FIG. 7 may represent one or more such blocks as appropriate to a specific embodiment or may be combined with other blocks. Also, the hierarchical slicing manager 722 may be implemented in software, hardware, firmware, or in some combination to achieve the capabilities described herein.

As shown, the computing device 700 includes a computer memory ("memory") 701, a display 702 (including, but not limited to a light emitting diode (LED) panel, cathode ray tube (CRT) display, liquid crystal display (LCD), touch screen display, projector, etc.), one or more Central Processing Units ("CPU") or other processors 703, Input/Output ("I/O") devices 704 (e.g., keyboard, mouse, RF or infrared receiver, universal serial bus (USB) ports, High-Definition Multimedia Interface (HDMI) ports, other communication ports, and the like), other computer-readable media 705, network connections 706, a power source (or interface to a power source) 707. The hierarchical slicing manager 722 is shown residing in memory 701. In other embodiments, some portion of the contents and some, or all, of the components of the hierarchical slicing manager 722 may be stored on and/or transmitted over the other computer-readable media 705. The components of the computing device 700 and hierarchical slicing manager 722 can execute on one or more processors 703 and implement applicable functions described herein. In some embodiments, the hierarchical slicing manager 722 may operate as, be part of, or work in conjunction and/or cooperation with other software applications stored in memory 701 or on various other computing devices. In some embodiments, the hierarchical slicing manager 722 also facilitates communication with peripheral devices via the I/O devices 704, or with another device or system via the network connections 706.

The one or more hierarchical slicing modules 724 is configured to perform actions related, directly or indirectly, to hierarchical slicing interpretation, management, or control as described herein. In some embodiments, the hierarchical slicing module(s) 724 stores, retrieves, or otherwise accesses at least some hierarchical slicing related data on some portion of the hierarchical slicing data storage 716 or other data storage internal or external to the computing device 700. In various embodiments, at least some of the hierarchical slicing modules 724 may be implemented in software or hardware.

Other code or programs 730 (e.g., further data processing modules, communication modules, a Web server, and the like), and potentially other data repositories, such as data repository 720 for storing other data, may also reside in the memory 701, and can execute on one or more processors 703. Of note, one or more of the components in FIG. 7 may or may not be present in any specific implementation. For example, some embodiments may not provide other computer readable media 705 or a display 702.

In some embodiments, the computing device 700 and hierarchical slicing manager 722 include API(s) that provides programmatic access to add, remove, or change one or more functions of the computing device 700. In some embodiments, components/modules of the computing device 700 and hierarchical slicing manager 722 are implemented using standard programming techniques. For example, the hierarchical slicing manager 722 may be implemented as an executable running on the processor(s) 703, along with one or more static or dynamic libraries. In other embodiments, the computing device 700 and hierarchical slicing manager 722 may be implemented as instructions processed by a virtual machine that executes as one of the other programs 730. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., MIL, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 700 to perform the functions of the hierarchical slicing manager 722. In some embodiments, instructions cause the one or more processors 703 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a hierarchical slicing manager 722 implementation. Also, other functions could be implemented and/or performed by each component/module, and in different orders, and by different components/modules, yet still achieve the functions of the computing device 700 and hierarchical slicing manager 722.

In addition, programming interfaces to the data stored as part of the computing device 700 and hierarchical slicing manager 722, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The hierarchical slicing data storage 716 and data repository 720 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the hierarchical slicing manager 722.

Furthermore, in some embodiments, some or all of the components of the computing device 700 and DL access manager 722 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The above description of illustrated embodiments is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method for hierarchical network slicing, comprising:
   obtaining a set of single network slice selection assistance information (S-NSSAI);
   for each S-NSSAI of the sets:
      determining a Tenant Slice-Group based, at least in part, on a slice differentiator (SD) part of the S-NSSAI; and
      implementing Unified Access Control (UAC) based, at least in part, on the SD part of the S-NSSAI; and
   processing the set of S-NSSAI in accordance with a hierarchy of network slicing including a plurality of Tenant Slice-Groups each including one or more network slices, wherein at least one function of each network slice under a Tenant Slice-Group in the hierarchy is inherited from a root corresponding to the Tenant Slice-Group.

2. The method of claim 1, wherein the SD part of the S-NSSAI is readable to a human reader and indicates a plain meaning in a human language.

3. The method of claim 1, wherein the set of S-NSSAI includes a plurality of subsets and each of the subsets includes a distinct SD part different from other subsets.

4. The method of claim 3, wherein the distinct SD part of each subset corresponds to a distinct Tenant Slice-Group in the hierarchy.

5. The method of claim 3, wherein each S-NSSAI from a target subset includes a distinct slice/service type (SST) part different from other S-NSSAI from the target subset.

6. The method of claim 5, wherein the distinct SST part of each S-NSSAI from the target subset corresponds to a distinct network slice of the distinct Tenant Slice-Group for the target subset in the hierarchy.

7. The method of claim 1, wherein a corresponding granularity of geographical area for each of the plurality of Tenant Slice-Groups is based, at least in part, on a set of cells defined by a mobile network operator (MNO) for the Tenant Slice-Group.

8. A non-transitory computer-readable medium storing contents that, when executed by one or more processors, cause the one or more processors to perform actions comprising:
   obtaining a set of single network slice selection assistance information (S-NSSAI);
   for each S-NSSAI of the sets:
      determining a Tenant Slice-Group based, at least in part, on a slice differentiator (SD) part of the S-NSSAI; and
      implementing Unified Access Control (UAC) based, at least in part, on the SD part of the S-NSSAI; and
   processing the set of S-NSSAI in accordance with a hierarchy of network slicing including a plurality of Tenant Slice-Groups each including one or more network slices, wherein at least one function of each network slice under a Tenant Slice-Group in the hierarchy is inherited from a root corresponding to the Tenant Slice-Group.

9. The computer-readable medium of claim 8, wherein the SD part of the S-NSSAI is readable to a human reader and indicates a plain meaning in a human language.

10. The computer-readable medium of claim 8, wherein the set of S-NSSAI includes a plurality of subsets and each of the subsets includes a distinct SD part different from other subsets.

11. The computer-readable medium of claim 10, wherein the distinct SD part of each subset corresponds to a distinct Tenant Slice-Group in the hierarchy.

12. The computer-readable medium of claim 10, wherein each S-NSSAI from a target subset includes a distinct slice/service type (SST) part different from other S-NSSAI from the target subset.

13. The computer-readable medium of claim 12, wherein the distinct SST part of each S-NSSAI from the target subset corresponds to a distinct network slice of the distinct Tenant Slice-Group for the target subset in the hierarchy.

14. The computer-readable medium of claim 8, wherein a corresponding granularity of geographical area for each of the plurality of Tenant Slice-Groups is based, at least in part, on a set of cells defined by a mobile network operator (MNO) for the Tenant Slice-Group.

15. A system, comprising:
   one or more processors; and
   memory storing contents that, when executed by the one or more processors, cause the system to perform actions comprising:
      obtaining a set of single network slice selection assistance information (S-NSSAI);
      for each S-NSSAI of the set:
         determining a Tenant Slice-Group based, at least in part, on a slice differentiator (SD) part of the S-NSSAI; and
         implementing Unified Access Control (UAC) based, at least in part, on the SD part of the S-NSSAI; and
      processing the set of S-NSSAI in accordance with a hierarchy of network slicing including a plurality of Tenant Slice-Groups each including one or more network slices, wherein at least one function of each network slice under a Tenant Slice-Group in the hierarchy is inherited from a root corresponding to the Tenant Slice-Group.

16. The system of claim 15, wherein the SD part of the S-NSSAI is readable to a human reader and indicates a plain meaning in a human language.

* * * * *

UNITED STATES PATENT AND TRADEMARK OFFICE
CERTIFICATE OF CORRECTION

PATENT NO. : 12,267,686 B2  
APPLICATION NO. : 17/744573  
DATED : April 1, 2025  
INVENTOR(S) : Mehdi Alasti et al.

Page 1 of 1

It is certified that error appears in the above-identified patent and that said Letters Patent is hereby corrected as shown below:

In the Claims

<u>Column 9, Claim 1, Line 28:</u>
"of the sets:" should read: -- of the set: --.

<u>Column 10, Claim 8, Line 3:</u>
"of the sets:" should read: -- of the set: --.

Signed and Sealed this  
Third Day of June, 2025

Coke Morgan Stewart  
*Acting Director of the United States Patent and Trademark Office*